United States Patent [19]

Song

[11] Patent Number: 4,783,840

[45] Date of Patent: Nov. 8, 1988

[54] METHOD FOR ENHANCING IMAGE DATA BY NOISE REDUCTION OR SHARPENING

[75] Inventor: Woo-Jin Song, Waltham, Mass.

[73] Assignee: Polaroid Corporation, Cambridge, Mass.

[21] Appl. No.: 128,937

[22] Filed: Dec. 4, 1987

[51] Int. Cl.⁴ .......................... G06K 9/40; G06K 9/44
[52] U.S. Cl. .................................. 382/54; 382/27; 382/55; 358/166
[58] Field of Search .................... 382/27, 54, 55; 358/166, 284

[56] References Cited

U.S. PATENT DOCUMENTS

| | | | |
|---|---|---|---|
| 4,003,024 | 1/1977 | Riganati et al. | 382/54 |
| 4,290,049 | 9/1981 | Sternberg et al. | 382/54 |
| 4,311,914 | 1/1982 | Huber | 382/54 |
| 4,520,505 | 5/1985 | Yamamoto et al. | 382/55 |
| 4,541,116 | 9/1985 | Lougheed | 382/54 |
| 4,663,655 | 5/1987 | Freeman | 358/41 |
| 4,691,366 | 9/1987 | Fenster et al. | 358/166 |
| 4,724,544 | 2/1988 | Matsumoto | 382/27 |

*Primary Examiner*—Leo H. Boudreau
*Assistant Examiner*—Donald J. Daley
*Attorney, Agent, or Firm*—Edward S. Roman

[57] ABSTRACT

An image enhancing process promotes either noise reduction or image sharpening on a pixel-by-pixel basis as a function of the recognition of specific patterns of sampled pixel values surrounding each pixel to be enhanced. The sampled pixel values are divided into two or more subgroups and the enhanced pixel value is provided to promote either image sharpening or noise reduction as a function of the number of pixel values in the different subgroups and their positions relative to each other in the subgroups.

18 Claims, 3 Drawing Sheets

METHOD FOR ENHANCING IMAGE DATA BY NOISE REDUCTION OR SHARPENING

BACKGROUND OF THE INVENTION

1. Field of the Invention

The invention relates generally to a process for enhancing image data by promoting either noise reduction or edge sharpening and, more particularly, for enhancing an image by recognizing specific patterns surrounding each pixel and promoting either noise reduction or edge sharpening as a function of the patterns so recognized.

2. Description of the Prior Art

Electronic imaging cameras for recording either motion or still images are well known in the art and in common usage today. Such cameras generally employ a two-dimensional photosensitive array which may comprise a high resolution charge coupled device (CCD) or charge injection device (CID) which receives image scene light in a well-known manner by way of an objective lens and shutter. The image sensing array typically comprises a plurality of image sensing elements or pixels arranged in a two-dimensional area array with each image sensing pixel converting the image defining scene light into a corresponding analog voltage value. The image sensing elements are preferably arranged in a plurality of columns and rows and for today's high resolution imaging applications may include more than 1,000 columns by 500 rows of image sensing pixels.

It is well known to enhance the image data derived from these light sensing devices to promote both noise reduction and image sharpening. Such enhancement may be accomplished on a pixel-by-pixel basis utilizing the surrounding pixel values of each pixel to be enhanced to provide selectively weighted average pixel values for improved image sharpness and nonweighted average pixel values for noise reduction. Most image enhancing processes provide for both noise reduction and image sharpening; however, noise reduction and image sharpening are inherently contradictory since any reduction in noise provided by nonweighted averaging will reappear upon image sharpening by a selectively weighted average.

Therefore, it is a primary object of this invention to provide an image enhancing process which promotes either noise reduction or image sharpening on a pixel-by-pixel basis as a function of the recognition of the patterns of pixel values immediately surrounding each pixel to be enhanced.

Other objects of the invention will, in part, be obvious and will, in part, appear hereinafter. The invention accordingly comprises a mechanism and system possessing the construction, combination of elements and arrangement of parts which are exemplified in the following detailed disclosure.

SUMMARY OF THE INVENTION

A process of enhancing image data comprising a plurality of pixel values received from a two-dimensional photosensitive array comprises the following steps. Succeeding pixel values to be enhanced are first selected from the array of pixel values together with select groups of surrounding pixel values. The value difference between each pixel value of the select group of surrounding pixel values it taken with respect to the pixel value to be enhanced. The pixel value having the greatest value difference from the pixel value to be enhanced is next determines. The select group of sampled surrounding pixel values it next subgrouped into a plurality of subgroups each comprising selected ones of the surrounding group of pixel values selected as a function of each pixel values's difference from the pixel value to be enhanced relative to the greatest value difference. The pixel value to be enhanced is next changed to an enhanced value to promote either image sharpness or reduced noise as a function of the number of pixel values in the subgroups and the position of the pixel values in the subgroups relative to each other. Succeeding pixel values are selected to be enhanced applying the aforementioned steps to provide an enhanced pixel value for each of the succeeding pixel values so selected until substantially all the pixel values from the array of pixel values are changed to an enhanced value.

DESCRIPTION OF THE DRAWINGS

The novel features that are considered characteristic of the invention are set forth with particularity both as to its organization and method of operation together with other objects and advantages thereof will be best understood from the following description of the illustrated embodiment when read in connection with the accompanying drawings wherein.

DESCRIPTION OF THE PREFERRED EMBODIMENT

Figure 1:
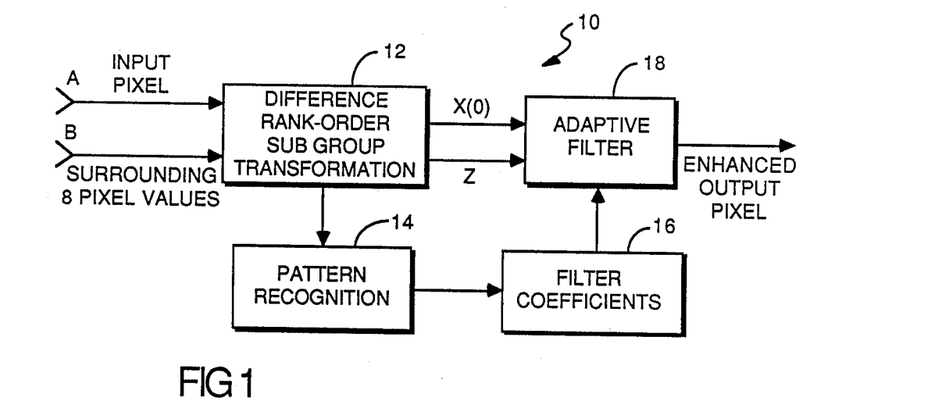
FIG. 1 is a schematic block diagram of a system for practicing the method of this invention for processing and enhancing image data.
Figure 2:
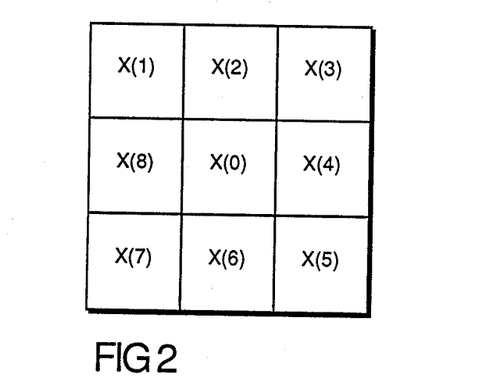
FIG. 2 is a plan view showing a portion of an area array of photosensitive pixels.

Referring now to FIG. 1, there is shown at 10 a schematic block diagram of a system for practicing the method of this invention for processing and enhancing image data corresponding to a plurality of pixel values that may be derived from a two-dimensional photosensitive array. A plurality of image defining pixel values may be provided by a two-dimensional photosensitive area array comprising a high resolution charge coupled device (CCD) or charge injection device (CID) which receives image scene light in a well-known manner by way of an objective lens and shutter (not shown). The image sensing array comprises a plurality of image sensing elements or pixels preferably arranged in a two-dimensional area array, a portion of which is shown in FIG. 2 wherein each image sensing pixel X(0) through X(8) converts the incident image defining scene light rays into a corresponding analog signal value. It can be seen that the image sensing pixels X(0)–X(8) are arranged in columns and rows as is well known in the art. As will be readily understood, image sensing arrays, particularly for sensing still images, comprise a substantially larger number of image sensing elements or pixels; and FIG. 2 illustrates only a small sample portion of a substantially larger image sensing array.

A processor 12 of the image processing and enhancing system 10 of FIG. 1 receives each pixel value to be enhanced at input terminal A together with a select group of that pixel value's surrounding pixel values at input terminal B. The processor ultimately subgroups the surrounding pixel values in a manner to be more fully explained in accordance with whether the surrounding pixel values are closer to the pixel value to be enhanced or closest to that one of the surrounding pixel values having the greatest value difference from the pixel value to be enhanced. Once the subgroups have been identified in this manner, a pattern recognition circuit 14 determines as a function of the number of pixel values in each of the subgroups and the position of pixel values in each of the subgroups whether image sharpening or noise reduction should be promoted. The pattern recognition circuit 14 then provides the appropriate output signals to a filter coefficient circuit 16 in accordance with this determination. The filter coefficient circuit 16, in turn, responds to provide the appropriate filter coefficients for either noise reduction or image sharpening to an adaptive filter 18 which, in turn, operates to change the input pixel value to an output pixel value enhanced to promote either noise reduction or image sharpening as a function of the filter coefficients input thereto.

Referring now to FIGS. 1 and 2 in conjunction with the flowchart of FIG. 3, the image enhancing process of this invention will be explained in detail. A first pixel value $X(0)$ is selected (block 20, FIG. 3) to be enhanced and input by way of terminal A to the processor 12 simultaneously with a select group of surrounding sampled pixel values $X(1)-X(8)$ (block 22, FIG. 3). The select group of surrounding sampled pixel values $X(1)$ through $X(8)$ comprise the eight immediately surrounding pixel values to the center pixel value $X(0)$ for which an enhanced pixel value is to be provided. For this example, the surrounding pixel values $X(1)$ through $X(8)$ are all assumed to be either greater in value or less in value than the center pixel value $X(0)$. In reality, the likelihood of all the surrounding pixel values $X(1)$ through $X(8)$ being either greater or less in value than the center pixel value $X(0)$ is remote; however, this constitutes the simplest example for purposes of explanation, and the more complicated example where the surrounding pixel values $X(1)$ through $X(8)$ are both greater and less in value than the center pixel value $X(0)$ will be subsequently described.

Figure 3:
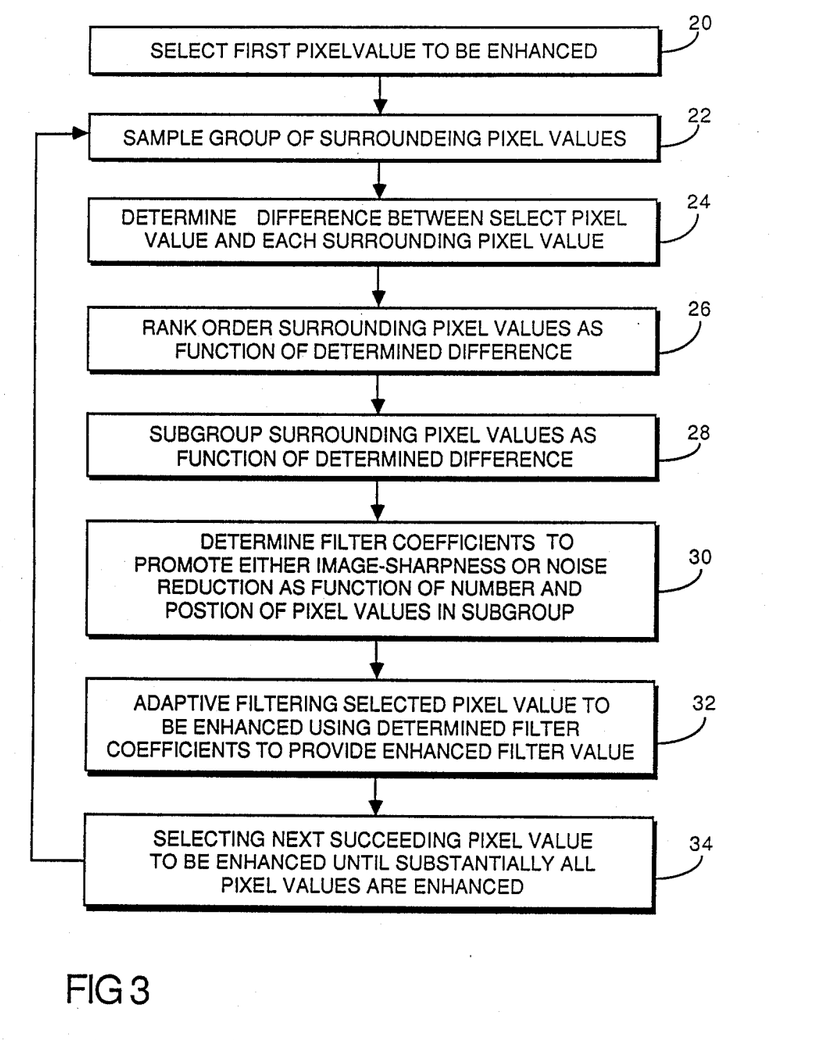
FIG. 3 is a flowchart illustrating the various steps in the process of this invention.

The processor 12 first operates to determine the absolute value difference between each pixel value of the select group of surrounding pixel values $X(1)$ through $X(8)$ and the pixel value $X(0)$ to be enhanced (block 24, FIG. 3). The difference in the intensity values of the pixels may be represented by the following equation: $D(i)=X(i)-X(0)$ where i equals 1, 2 ..., 8. In the next step, (block 26, FIG. 3) the processor 12 arranges the eight pixel values $X(1)$ through $X(8)$ to rank order according to the aforementioned absolute value differences computed between each of the sampled group of surrounding pixel values $X(1)$ through $X(8)$ and the center pixel value $X(0)$. The rank ordering is computationally accomplished by sorting the absolute value difference as shown in the following equation:

$$Z(J)=\text{ABS SORT } [D(i):i=1, 2 \ldots, 8]$$

$$J=1, 2, \ldots 8$$

or $$|Z(1)|<|Z(2)|<\ldots<|Z(8)|$$

$|Z(1)|$ and $|Z(8)|$ although referring to absolute value differences also coincidently determine, respectively, the nearest and furthest surrounding pixel values since the absolute value difference $|Z(1)|$ is the smallest absolute value difference determined and the absolute value difference $|Z(8)|$ is the largest absolute value difference determined. The processor 12 retains the original numerically designated position of the surrounding pixel values $X(1)$ through $X(8)$ as shown in FIG. 2 to be subsequently used in the manner of this invention to recognize characteristic patterns of the pixel values.

The group of surrounding pixel values $X(1)$ through $X(8)$ are next divided into subgroups (block 28, FIG. 3) in accordance with the determined absolute value differences with the center pixel value $X(0)$. The first subgroup comprises those of the surrounding group of pixel values $X(1)$ through $X(8)$ which are closer in value to the determined pixel value having the greatest absolute value difference $Z(8)$ than to the center pixel value $X(0)$ which is to be enhanced. A second subgroup is determined comprising those of the surrounding pixel values $X(1)$ through $X(8)$ which are closer to the center pixel value to be enhanced than to the determined pixel value having the greatest absolute value difference $Z(8)$. The first subgroup may be labeled w and determined in accordance with the following equation:

$$w=\{J:|Z(8)|-|Z(J)|<|Z(J)|\}$$

where J = 1, 2, ... 8
and the second subgroup may be labeled u and determined in accordance with the following equation:

$$u=\{J:\text{all } J\not\in w\}$$

The number of pixel values in each subgroup is denoted by $N(w)$ and $N(u)$, respectively, where $N(w)+N(u)=8$.

Pattern recognition circuit 14 of FIG. 1 thereafter operates in the following manner (block 30, FIG. 3) to determine whether noise reduction or image sharpening should be promoted as a function of the number of pixel values in the first and second subgroups and the position of the pixel values in the first and second subgroups relative to each other. Upon determination of whether noise reduction or image sharpening are to be promoted, the pattern recognition circuit 14 signals the filter coefficient circuit 16 to provide the appropriate coefficients to the adaptive filter 18 to accomplish either the determined noise reduction or image sharpening (block 32 of FIG. 3).

Figure 4:
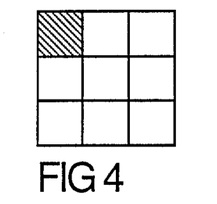
FIGS. 4, 5A, 5B, 6A, 6B, 7A, 7B, 8A, 8B, 9A, 9B, 10A, 10B, and 11 show various pixel value subgroupings in accordance with the process of this invention.

Pattern recognition first depends upon the number of pixel values of the surrounding pixel values $X(1)-X(8)$ which are subgrouped in the first and second subgroups (w, u). Remembering that the first subgroup (w) contains those pixel values having the greatest absolute value differences from the center pixel value $X(0)$ and that the second subgroup (u) contains those pixel values having the least absolute value differences from the center pixel value $X(0)$, there is shown in FIG. 4 one example for the first possible combination of subgroupings where the first subgroup (w) contains one pixel value and the second subgroup (u) contains the remaining seven pixel values. The lone pixel value of the first subgroup (w) is shown cross hatched and occupies the upper lefthand corner position of the surrounding group of pixel values although it will be understood that it could occupy any one of the surrounding pixel value positions $X(1)$ through $X(8)$ as shown in FIG. 2. For this pattern it is determined that the boundary between the two subgroups in all likelihood defines an edge line of the image as opposed to a noise-related discontinuity and thus should be appropriately sharpened. Therefore, the pattern recognition circuit 14 in this case provides the appropriate signals to control the filter coefficient circuit 16 to apply the appropriate coefficients to the adaptive filter 18 to achieve image sharpening.

Figure 5A:
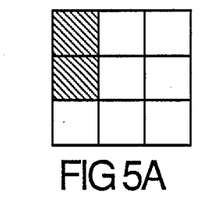
Figure 5B:
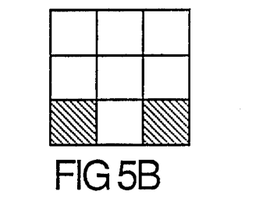

In the next case, the first subgroup (w) contains two pixel values and the second subgroup (u) contains six pixel values as shown in FIGS. 5A and 5B where the cross-hatched blocks represent pixel values of the first subgroup (w). For this situation, it is determined that if the two pixel values of the first subgroup (w) are adjacent each other as shown in FIG. 5A, then this is indicative of an edge line in the image, and image sharpening should be applied in the foregoing manner. However, if the two pixel values of the first subgroup are not adjacent as shown in FIG. 5B, then it is determined that this is more likely to be a noise-related discontinuity, and the pattern recognition circuit 14 signals the filter coefficient circuit 16 to apply the appropriate coefficients to the adaptive filter 18 to achieve noise reduction. The requirement of adjacency is computationally determined by taking the difference between the position designating numbers of the two pixel values of the first subgroup (w) as shown in FIG. 2. It is readily apparent from FIG. 2 that in order to determine adjacency the difference between the numbers designating the positions of any two pixel values must equal either 1 of 7. For the example shown in FIG. 5A the two pixel values correspond to X(1) and X(8), respectively, and the difference 8−1 meets the aforementioned computational requirement of 1 or 7 to establish adjacency. For the example shown in FIG. 5B, the two pixel values correspond to X(7) and X(5), respectively, and the difference 7−5 does not meet the computational requirement of 1 or 7 to establish adjacency.

Figure 6A:
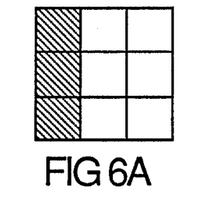
Figure 6B:
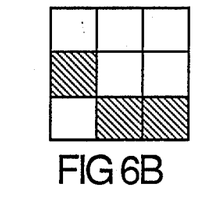

In the case where the first subgroup (w) contains three pixel values and the second subgroup (u) contains five pixel values examples of which are shown in FIGS. 6A and 6B, the pattern recognition circuit 14 controls the filter coefficients to promote image sharpening where the three pixel values of the first subgroup (w) are adjacent each other as shown in FIG. 6A. Again, adjacency is computationally determined in the aforementioned manner if the difference between any two pixel value position numbers as shown in FIG. 2 equals either 1 or 7. If the pixel values of the first subgroup (w) are not adjacent each other as, for example, shown in FIG. 6B, then this pattern is determined to be more likely representative of noise and, hence, the patterns recognition circuit 14 controls the filter coefficient circuit 16 to provide the appropriate coefficients to the adaptive filter 18 to promote noise reduction.

Figure 7A:
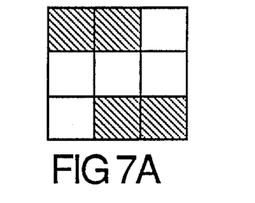
Figure 7B:
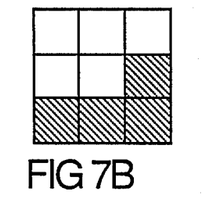

In the case where the first subgroup (w) contains four pixel values and the second subgroup (u) contains four pixel values examples of which are shown in FIGS. 7A and 7B, the pattern recognition circuit 14 provides the appropriate control signals to promote edge enhancement as opposed to noise reduction since patterns of this type are more likely to be representative of a defined edge in the image than of noise.

Figure 8A:
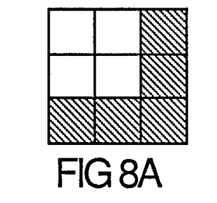
Figure 8B:
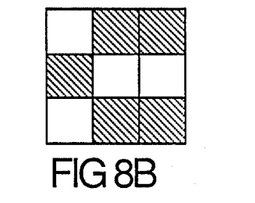

In the case where the first subgroup (w) contains five pixel values and the second subgroup (u) contains three pixel values, examples of which are shown in FIGS. 8A and 8B, the pattern recognition circuit 14 provides the appropriate control signals to promote image sharpness if the three pixel values of the second subgroup (u) are located on a corner as shown in FIG. 8A. As is readily apparent for the three pixel values to be located on a corner, the pixel values must be adjacent each other and thus adjacency must first be determined in the manner as previously described. If the three pixel values of the second subgroup (u) are determined to be adjacent with respect to each other, then it may be computationally determined whether the three adjacent pixel values are on the corner if the sum of the numbers designating the actual pixel value positions as shown in FIG. 2 add up to an odd number. For the example shown in FIG. 8A, it can be seen that X(8)+X(1)+X(2) add up to 11 which is an odd number thereby meeting the dual requirements of both adjacency and being located on a corner so as to warrant the application of the edge sharpening coefficients. For the example as shown in FIG. 8B, it can be seen that the three pixel values of the second subgroup (u) are neither adjacent nor on a corner and thus are more likely to be indicative of noise so as to cause the pattern recognition circuit 14 to provide the appropriate control signals to promote noise reduction.

Figure 9A:
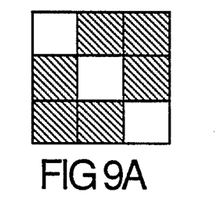
Figure 9B:
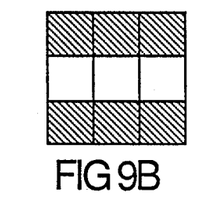

In the case where the first subgroup (w) contains six pixel values and the second subgroup (u) contains two pixel values the pattern recognition circuit 14 determines whether the two pixel values of the second subgroup (u) are antipodal as shown in the examples of FIGS. 9A and 9B. If the two pixel values of the second subgroup (u) are determined to be antipodal, then the pattern recognition circuit 14 provides the appropriate control signals to promote edge enhancement. If the two pixel values of the second subgroup (u) are not antipodal, then this pattern is more likely to be representative of noise, and the pattern recognition circuit 14 provides the appropriate control signals to promote noise reduction. Antipodality may be computationally determined if the absolute value difference between the two pixel values' numerical location as shown in FIG. 2 equals four. For the example of FIG. 9A the absolute value difference between the pixel value X(1) and X(5) is four thereby verifying antipodality. For the example of FIG. 9B the absolute value difference between the pixel value X(8) and X(4) is also four thereby also verifying antipodality.

Figure 10A:
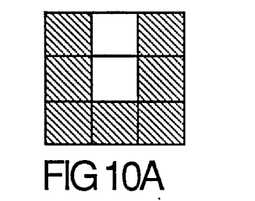
Figure 10B:
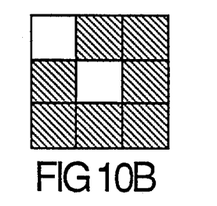

In the case where the first subgroup (w) contains seven pixel values and the second subgroup (u) contains one pixel value, the pattern recognition circuit 14 provides the appropriate control signals to provide image sharpening when a pixel value of the second subgroup (u) is on the side as shown in FIG. 10A. When the pixel value of the second subgroup (u) is on the corner as shown in FIG. 10B, then this pattern is more likely to be representative of noise, and the pattern recognition circuit 14 provides the appropriate control signals to promote noise reduction. As can be seen by referring to FIG. 2, pixel values located in corner positions have odd numbered designations such as X(1), X(3), X(5) and X(7). Pixel values having side positions have been numbered designations such as X(2), X(4), X(6) and X(8). Thus, whether a pixel value occupies a side or corner position can be computationally verified by determining whether the pixel value numerical designation is an odd or even number.

Figure 11:
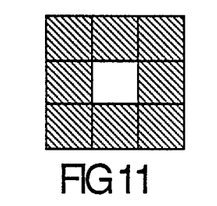

In the situation where the first subgroup (w) contains eight pixel values and the second subgroup (u) contains zero pixels as shown in FIG. 11, the pattern recognition circuit 14 applies the appropriate control signals to promote image sharpening if the value difference between that pixel value of the first subgroup (w) having the greatest absolute value difference $|Z(8)|$ from the center pixel value X(0) to be enhanced is ten times greater than the center pixel value. Otherwise, the pattern is most likely to be noise related, and the pattern recognition circuit 14 provides the appropriate control signals to promote noise reduction.

Thus, it can be seen that in this manner the adaptive filter 18 is provided with the appropriate filter coefficients to achieve either image sharpening or noise reduction as a function of the number of pixel values determined for the first and second subgroups (w), (u) and the position of the individual pixel values in the first and second subgroups as determined by the pattern recognition circuit 14. More specifically, the pattern recognition circuit 14 determines whether image sharpening or noise reduction will be promoted as a function of whether select ones of the pixel values of the first and second subgroups (w), (u) are adjacent, antipodal or on the side of corner of the select group of surrounding pixel values as shown in FIG. 2.

The adaptive filter 18 promotes image sharpening upon receipt of the appropriate filter coefficients from circuit 16 to provide an enhanced output pixel value (block 32, FIG. 3) as a function of selectively weighting the average from the center pixel value X(0) to be enhanced and the select group of surrounding pixel values X(1)-X(8) as shown in FIG. 2. The image sharpening routine imposed by the adaptive filter 18 may be of any well-known type such as that represented by the following equation:

$$y = (h0)\left[X(0) + \frac{1}{N(u)+1}\sum_u Z(J)\right] +$$

$$(h+)\left[X(0) + \frac{1}{N(u)+N(w)+1}\sum_{u,w} Z(J)\right]$$

where
 y = enhanced value of X(0) promoting image sharpening
 h0 = 1 + a
 h+ = −a
 a > 0
 a < 2.

The adaptive filter 18 upon receipt of the appropriate noise reducing filter coefficients from the filter coefficient circuit 16 operates to provide an enhanced output pixel value by determining a nonweighted average from the center pixel value X(0) to be enhanced and the select group of surrounding pixel values X(1) through X(8) as shown in FIG. 2. Again, the adaptive filter may apply any well-known noise reducing routine such as that illustrated in the following equation:

$$y = X(0) + \frac{1}{N(u)+1}\sum_u Z(J)$$

where
 y = enhanced value of X(0) promoting noise reduction.

As previously discussed, all of the surrounding pixel values X(1) through X(8) for the aforementioned example are either greater than or less than the center pixel value X(0); however, it is more likely that some of the pixel values X(1)-X(8) will be greater than the center pixel value X(0) and that others will be less than the pixel value X(0). For this case, the processor 12 operates in the aforementioned manner to take the absolute value difference between each pixel value of the select group of surrounding pixel values X(1)-X(8) and the pixel value X(0) to be enhanced (block 24 of FIG. 3). The processor 12 next rank orders the pixel values (block 26, FIG. 3) in accordance with the absolute value differences previously determined. The rank ordering of the absolute value differences for each of the select group of surrounding pixel values (X(1)-X(8) determines which one of the surrounding pixel values has the greatest absolute value difference $|Z(8)|$ from the center pixel value X(0) as previously described. The processor 12 thereafter operates to subgroup the pixel values X(1)-X(8) into a first subgroup (w) comprising those of the surrounding group of pixel values which are closer to the determined pixel value having the greatest absolute value difference $|Z(8)|$ than to the center pixel value X(0) to be enhanced. This determination may be made in accordance with the following equation:

$$w = \{J: |Z(8)| - |Z(J)| < |Z(J)| \text{ and } Z(8)Z(J) > \}$$

A second subgroup (v) is also determined for those of the surrounding group of pixel values X(1)-X(8) of FIG. 2 whose value is outside the range of pixel values defined by the first subgroup (w) and which have absolute value differences from the center pixel value X(0) which are greater in value than one-half the greatest absolute value difference $|Z(8)|$. The second subgroup (v) of pixel values may be determined in accordance with the following computation:

$$v = \{J: |Z(8)| - |Z(J)| < |Z(J)| \text{ and } Z(8)Z(J) < 0\}$$

A third subgroup of pixel values (u) comprises those of the surrounding pixel values X(1)-X(8) of FIG. 2 which are not included in the first and second subgroups (w, v).

The pattern recognition circuit 14 determines first whether there is one or more pixel values in the second subgroup (v). In the event that no pixel values come within the second subgroup (v), then pattern recognition continues in the previously described manner where the pixel values in the above-described third subgroup (u) are treated in the previously described manner in regard to the second subgroup. However, in the event that one or more pixel values are included in the second subgroup (v), then the pattern recognition circuit 14 determines whether the two pixel values of the second subgroup (v) which are closest in value to the center pixel value X(0) are antipodal. Again, antipodality is determined in the above-described manner. If the two closest pixel values of the second subgroup (v) are determined to be antipodal, then the pattern recognition circuit 14 provides the appropriate control signals to promote image sharpening. Conversely, if the two pixel values of the second subgroup (v) closest in value to the center pixel value X(0) are determined not to be antipodal, then the pattern recognition circuit 14 provides the appropriate control signals to promote noise reduction.

For the above-described example where pixel coefficients are found to be in all of the three subgroups (u, v and w), the computation for image sharpening provided by the adaptive filter 18 is in accordance with the following equation:

$$y = (h0)\left[X(0) + \frac{1}{N(u)+1}\sum_u Z(J)\right] +$$

$$(h+)\left[X(0) + \frac{1}{N(u)+N(v)+N(w)+1}\sum_{u,v,w} Z(J)\right]$$

where y = enhanced value of X(0) promoting image sharpness h0 = 1 + a h+ = −a a > 0 a < 2.

The computation for noise reduction in the aforementioned example where pixel values are included in three subgroups remains the same as the previously described in the example where pixel values are included in only two subgroups. As will be readily understood, once an enhanced pixel value is provided for the center pixel value X(0), a next succeeding pixel value is selected to be enhanced (block 34 of FIG. 3) and the aforementioned process repeated until all the original pixel values are provided with enhanced output pixel values. In this manner, the pixel values defining a complete image are individually enhanced with a view toward either promoting image sharpening or noise reduction depending upon the recognition of specific patterns surrounding each pixel. Since either edge sharpening or noise reduction are selected on a pixel-by-pixel basis, there is avoided the contradictory influences of providing both edge enhancement and noise reduction which work against each other to cancel each other's beneficial effects.

Although the eight immediately surrounding pixel values were selected in the above examples, it will be readily understood that the image enhancing process of this invention is by no means so limited and eight pixel values may be sampled from a substantially larger area of pixel values surrounding the center pixel X(0). Alternatively, more or less than eight pixel values may also be sampled. It will also be readily understood that the pixel values could also be representative of red, green or blue image data in a color imaging system or, alternatively, the pixel values could be representative of luminance image data.

Other embodiments of the invention, including additions, subtractions, deletions and other modifications of the preferred disclosed embodiments of the invention will be obvious to those skilled in the art and are within the scope of the following claims.

What is claimed is:

1. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

identifying select patterns of pixel values as a function of the value and position of the sampled group of surrounding pixel values and the pixel value to be enhanced relative to each other;

changing the pixel value to be enhanced to an enhanced value as a function of selected patterns recognized in the previous step to provide a choice between image sharpening or reduced noise; and selecting a succeeding pixel value to be enhanced from said array of pixel values and applying the above steps to provide an enhanced pixel value for the succeeding pixel value so selected until substantially all the pixel values from the array of pixel value are changed to enhanced values.

2. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value as a function of the number of pixel values in the subgroups and the positions of said pixel values in the subgroups relative to each other to provide a choice between image sharpening or noise reduction; and selecting a succeeding pixel value to be enhanced from said array of pixel values and applying the above steps to provide an enhanced pixel value for the succeeding pixel value so selected until substantially all the pixel values from the array of pixel values are changed to enhanced values.

3. The process of claim 2 wherein said step of changing the pixel value to be enhanced to an enhanced value when promoting image sharpening comprises the step of determining a selectively weighted average from the pixel value to be enhanced and the select group of surrounding pixel values.

4. The process of claim 2 wherein said step of changing the pixel value to be enhanced to an enhanced value when promoting noise reduction comprises the step of determining a nonweighted average from the pixel value to be enhanced and the select group of surrounding pixel values.

5. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said step of changing the pixel value to be enhanced to promote either image sharpening or noise reduction further operates as a function of whether select ones of the pixel values of the subgroups are adjacent, antipodal or on the side or corner of the select group of surrounding pixel values.

6. The process of claim 2 wherein said subgrouping step provides a first subgroup comprising those of the surrounding pixel values closer to the previously determined pixel value having the greatest value difference than to the pixel values to be enhanced and a second subgroup comprising those of the surrounding pixel values not in the first subgroup.

7. The process of claim 6 wherein the pixel value selected to be enhanced comprises a central pixel value and the select group of surrounding pixel values comprises eight pixel values uniformly spaced in rows and columns about the central pixel value so that each row on either side of the center pixel value comprises three pixel values and each column on either side of the central pixel value comprises three pixel values.

8. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said subgrouping step provides a first subgroup comprising those of the surrounding pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein the central pixel value is enhanced to promote image sharpening if the first subgroup contains one pixel value and the second subgroup contains seven pixel values.

9. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said subgrouping step provides a first subgroup comprising those of the surrounding pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein the central pixel value is enhanced to promote image sharpening if the first subgroup contains four pixel values and the second subgroup contains four pixel values.

10. A process for enhancing data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said subgrouping step provides a first subgroup comprising those of the surrounding pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein if the first subgroup contains two pixel values and the second subgroup contains six pixel values, the central pixel value is enhanced to promote image sharpening if the two pixel values of the first subgroup are adjacent to each other or noise reduction if the two pixel values of the first subgroup are not adjacent to each other.

11. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said subgrouping step provides a first subgroup comprising those of the surroundings pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein if the first subgroup contains three pixel values and the second subgroup contains five pixel values, the central pixel value is enhanced to promote image sharpening if the three pixel values of the first subgroup are adjacent to each other or noise reduction if the three pixel values of the first subgroup are not adjacent to each other.

12. A process for enhancing image data defined by a two-dimensional array of pixel values comprising the steps of;

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said subgrouping step provides a first subgroup comprising those of the surrounding pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein if the first subgroup contains five pixel values and the second subgroup contains three pixel values, the central pixel value is enhanced to promote image sharpening if the three pixel values of the second subgroup are adjacent each other and on a corner of the select group of surrounding pixel values, or noise reduction if the three pixel values of the second subgroup are either not adjacent each other or not on a corner of the select group of surrounding pixel values.

13. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said subgrouping step provides a first subgroup comprising those of the surrounding pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein if the first subgroup contains six pixel values and the second subgroup contains two pixel values, the central pixel value is enhanced to promote image sharpening if the two pixel values of the second subgroup are antipodal or noise reduction if the two pixel values of the second subgroup are not antipodal.

14. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein said subgrouping step provides a first subgroup comprising those of the surrounding pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein if the first subgroup contains seven pixel values and the second subgroup contains one pixel value, the central pixel value is enhanced to promote image sharpening if the pixel value of the second subgroup is not on a corner of the select group of surrounding pixel values, or noise reduction if the pixel value of the second subgroup is on a corner of the select group of surrounding pixel values.

15. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values of the subgroups and the position of said pixel values in the subgroups relative to each other; and selecting a succeeding pixel value to be enhanced from said array of pixel values and applying the above steps to provide an enhanced pixel value of the succeeding pixel value so selected until substantially all the pixel values from the array of pixel values are changed to enhanced values wherein said subgrouping step provides a first subgroup comprising those of the surrounding pixel values closer to the previously determined pixel value having the greatest value difference than to the pixel value to be enhanced and a second subgroup comprising those of the surrounding pixel values not in the first subgroup and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the central pixel value comprises three pixel values and wherein if the first subgroup contains eight pixel values and the second subgroup contains no pixel values, the central pixel value is enhanced to promote image sharpening if the greatest value difference is a select order of magnitude greater than the central pixel value.

16. The process of claim 2 wherein: each pixel value of the select group of surrounding pixel values may be either greater than or less than the pixel value to be enhanced, said step of taking the value difference operates to take the absolute value difference between each pixel value of the select group of surrounding pixel values and the pixel value to be enhanced, said step of determining which one of the surrounding pixel values has the greatest value difference operates to determine which one of the surrounding pixel values has the greatest absolute value difference from the pixel value to be enhanced, and said subgrouping step operates to provide a first subgroup comprising those of the surrounding pixel values closer to the previously determined pixel value having the greatest value difference than to the pixel value to be enhanced, a second subgroup comprising those of the surrounding group of pixel values which are outside the range of pixel values defined by the first subgroup and which have absolute value differences from the central pixel value greater than one-half the greatest absolute value difference, and a third subgroup comprising those of the surrounding pixel values not included in the first and second subgroups.

17. The process of claim 16 wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the center pixel value comprises three pixel values.

18. A process for enhancing image data defined by a two-dimensional array of pixel values comprising the steps of:

selecting a pixel value to be enhanced from the array of pixel values;

sampling a select group of pixel values surrounding the pixel value to be enhanced from the array of pixel values;

taking the value difference between each pixel value of the select group of surrounding pixel values and the pixel value to be enhanced;

determining which one of the surrounding pixel values has the greatest value difference from the pixel value to be enhanced;

subgrouping the select group of surrounding pixel values into a plurality of subgroups each comprising select ones of the surrounding group of pixel values selected as a function of each pixel value's difference from the pixel value to be enhanced relative to the greatest value difference;

changing the pixel value to be enhanced to an enhanced value to promote either image sharpening or reduced noise as a function of the number of pixel values in the subgroups and the position of said pixel values in the subgroups relative to each other; and selecting a succeeding pixel value to be enhanced from said array of pixel values and applying the above steps to provide an enhanced pixel value for the succeeding pixel value so selected until substantially all the pixel values from the array of pixel values are changed to enhanced values wherein: each pixel value of the select group of surrounding pixel values may be either greater than or less than the pixel value to be enhanced, said step of taking the value difference operates to take the absolute value difference between each pixel value of the select group of surrounding pixel values and the pixel value to be enhanced, said step of determining which one of the surrounding pixel values has the greatest value difference operates to determine which one of the surrounding pixel values has the greatest absolute value difference from the pixel value to be enhanced, and said subgrouping step operates to provide a first subgroup comprising those of the surrounding pixel values closer to the previously determined pixel value having the greatest value difference than to the pixel value to be enhanced, a second subgroup comprising those of the surrounding group of pixel values which are outside the range of pixel values defined by the first subgroup and which have absolute value differences from the central pixel value greater than one-half the greatest absolute value difference, and a third subgroup comprising those of the surrounding pixel values not included in the first and second subgroups and wherein the pixel value selected to be enhanced comprises a central pixel value and the select group of surrounding pixel values comprises eight pixel values uniformly spaced in rows and columns about the central pixel value so that each row on either side of the central pixel value comprises three pixel values and each column on either side of the center pixel comprises three pixel values and wherein if the second subgroup contains one or more pixel values, then the central pixel value is enhanced to promote image sharpening if the two pixel values of the select group of surrounding pixel values closest in absolute value difference to the central pixel value are antipodal or noise reduction if the two pixel values of the select group of surrounding pixel values closest in absolute value difference to the central pixel value are not antipodal.

* * * * *